United States Patent Office 3,225,027
Patented Dec. 21, 1965

3,225,027
REACTIVE NAPHTHOL MONOAZO DYESTUFFS
Ronald Baker and Ian Durham Rattee, Manchester, England, assignors to Imperial Chemical Industries Limited, London, England, a corporation of Great Britain
No Drawing. Filed Jan. 18, 1963, Ser. No. 252,292
Claims priority, application Great Britain, Jan. 29, 1962, 3,230/62
4 Claims. (Cl. 260—194)

This invention relates to new azo dyestuffs and more particularly it relates to new water-soluble monoazo dyestuffs which are valuable for colouring textile materials, in particular cellulose textile materials.

According to the invention there are provided the monoazo dyestuffs which, in the form of the free acids, are represented by the formula:

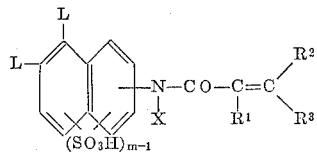

wherein X represents a hydrogen atom or a lower alkyl radical, $R^1$ and $R^2$ each independently represent hydrogen or chlorine atoms, $R^3$ represents hydrogen, chlorine, carboxylic acid or methyl, $m$ represents 1, 2 or 3, one L represents a hydroxy group and the other L represents a group of the formula:

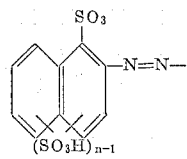

wherein $n$ represents 1, 2 or 3.

The lower alkyl radicals represented by X are alkyl radicals containing from 1 to 4 carbon atoms, such as the methyl radical.

It is however preferred that X, $R^1$, $R^2$ and $R^3$ each represent a hydrogen atom.

According to a further feature of the invention there is provided a process for the manufacture of the monoazo dyestuffs, as hereinbefore defined, which comprises treating a naphthol of the formula:

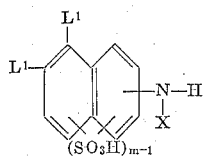

Formula I wherein $m$ and X have the meanings stated, and one $L^1$ represents a hydrogen atom and the other $L^1$ represents a hydroxy group, with a diazo compound derived from an amine of the formula:

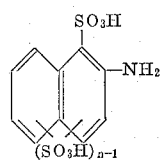

Formula II wherein $n$ has the meaning stated, and with an acylating agent derived from an acid of the formula:

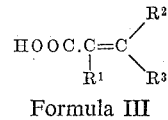

Formula III wherein $R^1$, $R^2$ and $R^3$ have the meanings stated.

In carrying out the process of the invention the naphthol of Formula I can either be treated with the said acylating agent to give an acyl derivative of the formula:

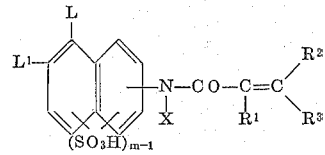

Formula IV wherein $L^1$, $m$, X, $R^1$, $R^2$ and $R^3$ have the meanings stated, which is then subsequently treated with the said diazo compound, or treated with the said diazo compound to give an azo compound of the formula:

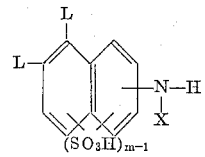

Formula V wherein L, X, and $m$ have the meanings stated, which is then subsequently treated with the said acylating agent.

The acyl derivatives of Formula IV can conveniently be obtained by adding the said acylating agent to an aqueous solution of the sodium salt of the naphthol of Formula I, stirring the resulting mixture, preferably at a temperature between 0° and 30° C., whilst adding an acid-binding agent such as sodium carbonate or sodium acetate, and if desired isolating the resulting acyl derivative by the addition of sodium chloride or hydrochloric acid. The subsequent reaction of the said acyl derivative with the diazo compound derived from an amine of Formula II is preferably carried out in aqueous alkaline medium; the resulting azo dyestuff being isolated by conventional methods.

The azo compounds of Formula V are obtained by treating a naphthol of Formula I with a diazo component of an amine of Formula II in aqueous alkaline medium, and, if desired, isolating the azo compound of Formula V. The subsequent reaction of the said azo compound with the said acylating agent can be carried out by adding the acylating agent to an aqueous solution of the azo compound or the sodium salt thereof, stirring the resulting mixture, preferably at a temperature between 0° and 20° C., whilst adding an acid-binding agent such as sodium acetate or sodium carbonate, and finally isolating the resulting azo dyestuff by conventional methods.

As examples of the naphthols of Formula I there may be mentioned 1-amino-7-naphthol, 1-amino-6-naphthol, 2-amino-8-naphthol, 1-amino-8-naphthol-4-sulphonic acid and the N-lower alkyl derivatives thereof, 2-amino-5-naphthol-7-sulphonic acid and the N-lower alkyl derivatives thereof, 2-amino-8-naphthol-6-sulphonic acid and the N-lower alkyl derivatives thereof, 1-amino-8-naphthol-3:6- or 4:6-disulphonic acid and the N-lower alkyl derivatives thereof, and 2-amino-5-naphthol-1:7-disulphonic acid.

As examples of amines of Formula II there may be mentioned 2-naphthylamine-1-sulphonic acid, 2-naphthylamine-1:5-disulphonic acid and 2-naphthylamine-1:5:7-trisulphonic acid.

As examples of acylating agents derived from the acids of Formula III there may be mentioned α-chloroacryloyl-chloride, acryloyl bromide, α-methylacryloyl chloride, α:β:β-trichloroacryloyl chloride, maleic anhydride, and, preferably, acryloyl chloride.

As examples of the acyl derivatives of Formula IV there may be mentioned 1-acryloylamino-8-naphthol-3:6- or -4:6-disulphonic acid, 2-acryloylamino-8-naphthol-6-sulphonic acid, 2-acryloylamino-5-naphthol-7-sulphonic acid, 1-acryloyl-amino-6- or -7-naphthol, 1-(β-chloroacryloylamino)-8-naphthol-3:6-disulphonic acid, 2-(α-chloroacryloylamino)-8-naphthol-6-sulphonic acid and 2-(α:β:β-trichloroacryloylamino)-5-naphthol-7-sulphonic acid.

One preferred class of the monoazo dyestuffs of the invention are the monoazo dyestuffs which, in the form of the free acids, are represented by the formula:

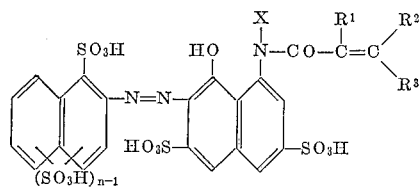

wherein X, $R^1$, $R^2$, $R^3$ and $n$ have the meanings stated.

A second preferred class of the monoazo dyestuffs of the invention are the monoazo dyestuffs which, in the form of the free acids, are represented by the formula:

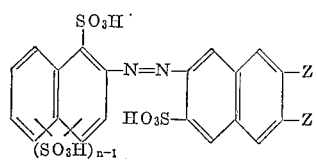

wherein $n$ represents 1, 2 or 3, one Z represents a hydrogen atom and the other Z represents a

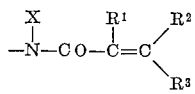

group, wherein X, $R^1$, $R^2$ and $R^3$ have the meanings stated.

In these preferred classes it is further preferred that X, $R^1$, $R^2$ and $R^3$ each represent a hydrogen atom.

The monoazo dyestuffs of the invention are valuable for colouring natural and artificial textile materials for example textile materials comprising cotton, viscose rayon, regenerated cellulose, wool, silk, polyamides and modified polyacrylonitrile fibres. For this purpose the dyestuffs can be applied to the textile materials by dyeing, padding or printing using in the latter case printing pastes containing the conventional thickening agents or oil-in-water emulsions or water-in-oil emulsions, whereby the textile materials are coloured in bright shades possessing excellent fastness to wet treatments such as washing, hypochlorite bleach (fastness to chlorine) and to acids. It is also found that the dyestuffs build up well on textile materials to give heavy depths of shade.

The monoazo dyestuffs are particularly valuable as "reactive" dyestuffs for colouring cellulose textile materials. For this purpose the dyestuffs are preferably applied to the cellulose textile materials in conjunction with a treatment with an alkaline agent, for example sodium carbonate or bicarbonate, sodium metasilicate, trisodium phosphate or sodium hydroxide, which may be applied to the cellulose textile material before, during or after the application of the dyestuff. Alternatively when the dyed textile material is to be subsequently heated or steamed a substance such as sodium trichloroacetate, which becomes alkaline on heating or steaming, can be used.

The monoazo dyestuffs of the invention are also useful for colouring nitrogen-containing textile materials, for example polyamide textile materials, but, more particularly, woollen textile materials.

The monoazo dyestuffs of the invention can be applied to nitrogen-containing textile materials from a mildly alkaline, neutral or acid dyebath. The dyeing process can be carried out at a constant or substantially constant pH, that is to say the pH of the dyebath remains constant or substantially constant during the dyeing process, or if desired the pH of the dyebath can be altered at any stage of the dyeing process by the addition of acids or acid salts or alkalis or alkaline salts. For example dyeing may be started at a dyebath pH of about 3.5 to 5.5 and raised during the dyeing process to about 6.5 to 7.5 or higher if desired. The dyebath may also contain substances which are commonly used in the dyeing of nitrogen-containing textile materials. As examples of such substances there may be mentioned ammonium acetate, sodium sulphate, ethyl tartrate, nonionic dispersing agents such as condensates of ethylene oxide with amines, fatty alcohols or phenols, surface active cationic agents such as quaternary ammonium salts for example cetyl trimethylammonium bromide and cetyl pyridinium bromide and organic liquids such as n-butanol and benzyl alcohol.

When so applied to woollen textile materials the dyestuffs give bright shades possessing excellent fastness to wet treatments such as washing and milling.

The invention is illustrated but not limited by the following examples in which the parts and percentages are by weight.

EXAMPLE 1

A solution of 24.5 parts of the sodium salt of 2-naphthylamine-1-sulphonic acid in 225 parts of water is cooled to between 0° and 5° C., and 22.6 parts of a concentrated aqueous solution of hydrochloric acid and 6.9 parts of sodium nitrite are then added. The resulting mixture is then added to a solution of 45.8 parts of the disodium salt of 1-acryloyl-amino-8-naphthol-3:6-disulphonic acid (which is obtained by treating 1-amino-8-naphthol-3:6-disulphonic acid with acryloyl chloride in water in the presence of sodium carbonate) and 13.5 parts of sodium carbonate in 580 parts of water, and the mixture is then stirred for 18 hours at a temperature between 0° and 5° C. 180 parts of sodium chloride are then added and the dyestuff which is precipitated is filtered off and dried.

When applied to cellulose textile materials in conjunction with a treatment with an acid-binding agent the dyestuff yields bright red shades possessing very good fastness to light and to washing.

EXAMPLE 2

A solution of 61.9 parts of the trisodium salt of 1-amino-7-(naphth-2'-ylazo)-8-naphthol-1':3:6-trisulphonic acid (which is obtained by coupling diazotised 2-naphthylamine-1-sulphonic acid with 1-amino-8-naphthol-3:6-disulphonic acid in aqueous alkaline medium) in 1000 parts of water is cooled to 2° C., and 45.25 parts of acryloyl chloride are then gradually added during 1 hour, the temperature of the mixture being maintained between 0° and 5° C. by external cooling and the pH of the mixture being maintained between 6 and 7 by the simultaneous gradual addition of a saturated aqueous solution of sodium carbonate. The resulting mixture is stirred for 10 hours at 20° C., 150 parts of sodium chloride are then added, and the precipitated dyestuff is filtered off and dried.

The dyestuff so obtained is identical with the dyestuff obtained as described in Example 1.

The following table gives further examples of dyestuffs of the invention which are obtained by methods similar to that described in Example 1 by coupling a diazo derivative of the amines listed in the second column of the table with the acyl derivatives which are obtained by treating the naphthols listed in the third column of the table with an acylating agent of the acids listed in the fourth column of the table. The fifth column of the table indicates the shades obtained when the resulting dyestuffs are applied to cellulose textile materials in conjunction with an acid-binding agent.

2. Dyestuffs of the formula:

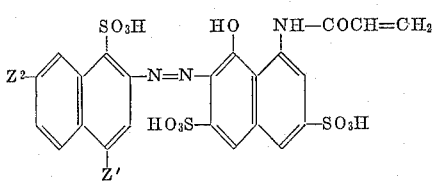

wherein $Z'$ and $Z^2$ are selected from the group consisting of hydrogen and sulphonic acid.

Table

| Example | Amine | Naphthol | Acid | Shade |
|---|---|---|---|---|
| 3 | 2-naphthylamine-1-sulphonic acid | 2-amino-8-naphthol-6-sulphonic acid | Acrylic acid | Red. |
| 4 | do | 1-amino-8-naphthol-3:6-disulphonic acid | 3-chloroacrylic acid | Do. |
| 5 | do | 2-amino-5-naphthol-7-sulphonic acid | α:β:β-trichloroacrylic acid | Orange. |
| 6 | do | do | Acrylic acid | Do. |
| 7 | 2-naphthylamine-1:5-disulphonic acid | 1-amino-8-naphthol-3:6-disulphonic acid | do | Red. |
| 8 | 2-naphthylamine-1:5:7-trisulphonic acid | 1-amino-7-naphthol | do | Reddish-Orange. |
| 9 | do | 2-amino-5-naphthol-7-sulphonic acid | do | Orange. |
| 10 | do | do | Maleic acid | Do. |

The following table gives further examples of dyestuffs of the invention which are obtained by treating azo compounds which are themselves obtained by coupling diazo compounds of the amines listed in the second column of the table with the naphthols listed in the third column of the table with acylating agents of the acids listed in the fourth column of the table by methods similar to that described in Example 2. The fifth column of the table indicates the shade obtained when the dyestuffs are applied to cellulose textile materials in conjunction with a treatment with an acid-binding agent.

3. Dyestuffs of the formula:

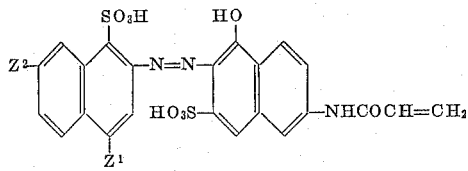

wherein $Z^1$ and $Z^2$ are selected from the group consisting of hydrogen and sulphonic acid.

Table

| Example | Amine | Naphthol | Acid | Shade |
|---|---|---|---|---|
| 11 | 2-naphthylamine-1-sulphonic acid | 1-amino-8-naphthol-4:6-disulphonic acid | Acrylic acid | Red. |
| 12 | do | do | α-Chloroacrylic acid | Do. |
| 13 | do | do | Crotonic acid | Do. |
| 14 | 2-naphthylamine-1:5-disulphonic acid | 1-amino-8-naphthol-3:6-disulphonic acid | β-Chlorocrotonic acid | Do. |
| 15 | do | 2-methylamino-5-naphthol-7-sulphonic acid | Acrylic acid | Orange. |

What we claim is:

1. Dyestuffs of the formula:

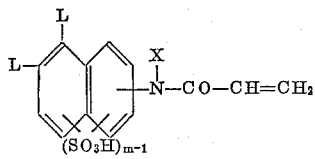

wherein X represents a member selected from the class consisting of hydrogen and lower alkyl; $m$ represents an integer of from 1 to 3; and one L represents a hydroxy group and the other L represents a group of the formula:

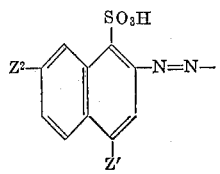

wherein $Z'$ and $Z^2$ are selected from the group consisting of hydrogen and sulphonic acid.

4. Dyestuffs of the formula:

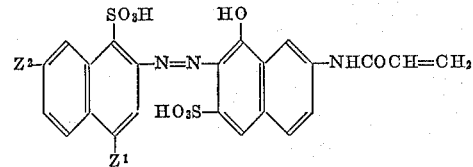

wherein $Z^1$ and $Z^2$ are selected from the group consisting of hydrogen and sulphonic acid.

References Cited by the Examiner

UNITED STATES PATENTS

| | | | |
|---|---|---|---|
| 2,951,070 | 8/1960 | Stephen et al. | 260—194 XR |
| 2,951,071 | 8/1960 | Tilley et al. | 260—194 XR |
| 3,057,673 | 10/1962 | Mills et al. | 260—153 XR |
| 3,133,909 | 5/1964 | Riat | 260—194 XR |

OTHER REFERENCES

J. Wegmann: Textil Praxis (October 1958) pp. 1056–61.

CHARLES B. PARKER, *Primary Examiner.*